United States Patent
Zhang et al.

(10) Patent No.: US 9,403,687 B2
(45) Date of Patent: Aug. 2, 2016

(54) METHOD FOR PREPARATION OF AMORPHOUS SILICA FROM BIOMASS

(71) Applicant: Wuhan Kaidi General Research Institute of Engineering & Technology Co., Ltd., Wuhan (CN)

(72) Inventors: Yanfeng Zhang, Wuhan (CN); Minxia Cao, Wuhan (CN); Hong Li, Wuhan (CN); Qi Rao, Wuhan (CN)

(73) Assignee: WUHAN KAIDI ENGINEERING TECHNOLOGY RESEARCH INSTITUTE CO., LTD., Wuhan (CN)

( * ) Notice: Subject to any disclaimer, the term of this patent is extended or adjusted under 35 U.S.C. 154(b) by 0 days.

(21) Appl. No.: 14/324,058

(22) Filed: Jul. 3, 2014

(65) Prior Publication Data

US 2014/0322120 A1     Oct. 30, 2014

Related U.S. Application Data

(63) Continuation-in-part of application No. PCT/CN2012/087604, filed on Dec. 27, 2012.

(30) Foreign Application Priority Data

Jan. 5, 2012 (CN) .......................... 2012 1 0002005

(51) Int. Cl.
*C01B 33/12* (2006.01)

(52) U.S. Cl.
CPC .......... *C01B 33/126* (2013.01); *C01P 2004/64* (2013.01)

(58) Field of Classification Search
CPC .......................... C01B 33/126; C01P 2004/64
USPC ......................................................... 423/335
See application file for complete search history.

(56) References Cited

U.S. PATENT DOCUMENTS

| | | | | |
|---|---|---|---|---|
| 4,214,920 A | * | 7/1980 | Amick | ................ C01B 33/025 106/475 |
| 6,444,186 B1 | * | 9/2002 | Vempati | ................ C01B 33/12 423/335 |

FOREIGN PATENT DOCUMENTS

| | | | |
|---|---|---|---|
| CN | 1935648 A | * | 3/2007 |
| CN | 101673781 B | * | 9/2009 |
| CN | 101417798 B | * | 5/2011 |

\* cited by examiner

*Primary Examiner* — Anthony J Zimmer
(74) *Attorney, Agent, or Firm* — Matthias Scholl P.C.; Matthias Scholl

(57) ABSTRACT

A method for preparation of amorphous silica from biomass. The method includes pyrolyzing the biomass under anaerobic conditions to yield a pyrolysis gas and solid residues, collecting the pyrolysis gas, and calcining the solid residues under aerobic conditions to yield amorphous silica.

8 Claims, 3 Drawing Sheets

METHOD FOR PREPARATION OF AMORPHOUS SILICA FROM BIOMASS

CROSS-REFERENCE TO RELATED APPLICATIONS

This application is a continuation-in-part of International Patent Application No. PCT/CN2012/087604 with an international filing date of Dec. 27, 2012, designating the United States, now pending, and further claims priority benefits to Chinese Patent Application No. 201210002005.9 filed Jan. 5, 2012. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18$^{th}$ Floor, Cambridge, Mass. 02142.

BACKGROUND OF THE INVENTION

1. Field of the Invention

The invention relates to the application of biomass, and more particularly to a method for preparation of amorphous silica (silicon dioxide) from biomass.

2. Description of the Related Art

Although silica is abundant in natural resources, the high purity of amorphous silica is hardly found. Conventional methods for preparation of amorphous silica from inorganic materials involve high production costs, large energy consumption, and serious environmental pollution. And methods for preparation of amorphous silica from biomass have low coefficient of utilization of organic matters and energy.

SUMMARY OF THE INVENTION

It is one objective of the invention to provide a method for preparation of amorphous silica from biomass.

To achieve the above objective, in accordance with one embodiment of the invention, there is provided a method for preparation of amorphous silica from biomass. The method comprises pyrolyzing the biomass under anaerobic conditions to yield pyrolysis gas and solid residues, collecting the pyrolysis gas, and calcining the solid residues under aerobic conditions to yield amorphous silica.

In a class of this embodiment, the biomass containing amorphous silica is rice hull.

In a class of this embodiment, the method further comprises step A: acid-washing and drying the biomass before the pyrolysis of the biomass, or step B: acid-washing and drying the biomass after the pyrolysis of the biomass. The acid-washing and drying of the biomass before the pyrolysis of the biomass can transform metallic elements therein into soluble metal salts, which facilitates the removal of the metallic elements by water washing. Meanwhile, the long chain organic matters of the biomass are reduced, which facilitates the subsequent pyrolysis.

In a class of this embodiment, the acid-washing and drying of the biomass comprises soaking the biomass in an acid solution at normal temperature for between 8 and 24 hours, or at between 80 and 100° C. for between 2 and 6 hours, washing the biomass to be neutral, and drying the biomass.

In a class of this embodiment, the acid solution is hydrochloric acid, sulfuric acid, or nitric acid, and a weight concentration thereof is between 3 and 10 wt. %.

In a class of this embodiment, the biomass is pyrolyzed at a temperature of between 500 and 1000° C.

In a class of this embodiment, the pyrolysis gas comprises CO, $CO_2$, $H_2$, $CH_4$, $C_2H_2$, $C_2H_4$, $C_2H_6$, $C_3H_8$, $C_3H_{10}$, or a mixture thereof.

In a class of this embodiment, the calcination is carried out in the presence of air, and a calcination temperature of the solid residues is between 500 and 800° C.

In a class of this embodiment, a thermal flue gas resulting from the calcination of the solid residues is conveyed back to a pyrolysis furnace for the heat cycle of the pyrolysis.

In a class of this embodiment, before the pyrolysis of the biomass or before the acid-washing and drying of the biomass, the method further comprises washing with water the biomass for removal of impurities.

Advantages according to embodiments of the invention are summarized as follows. The biomass containing amorphous silica is pyrolyzed under anaerobic conditions, that is to say, the cellulose, hemicellulose, and lignin of the biomass are pyrolyzed to yield pyrolysis gas which is recycled for power generation or for preparation of syngas. However, the structure of amorphous silica is not destroyed. The resulting solid residues are calcined under aerobic conditions for removal of carbon residue. Thus, high added value of amorphous nano silica is obtained. The method has a simple process, high energy transformation and usage ratio, thereby being environment-friendly and energy-saving.

DETAILED DESCRIPTION OF THE EMBODIMENTS

Further description of the invention will be given below in conjunction with specific embodiments and accompanying drawings.

Example 1

Figure 1:
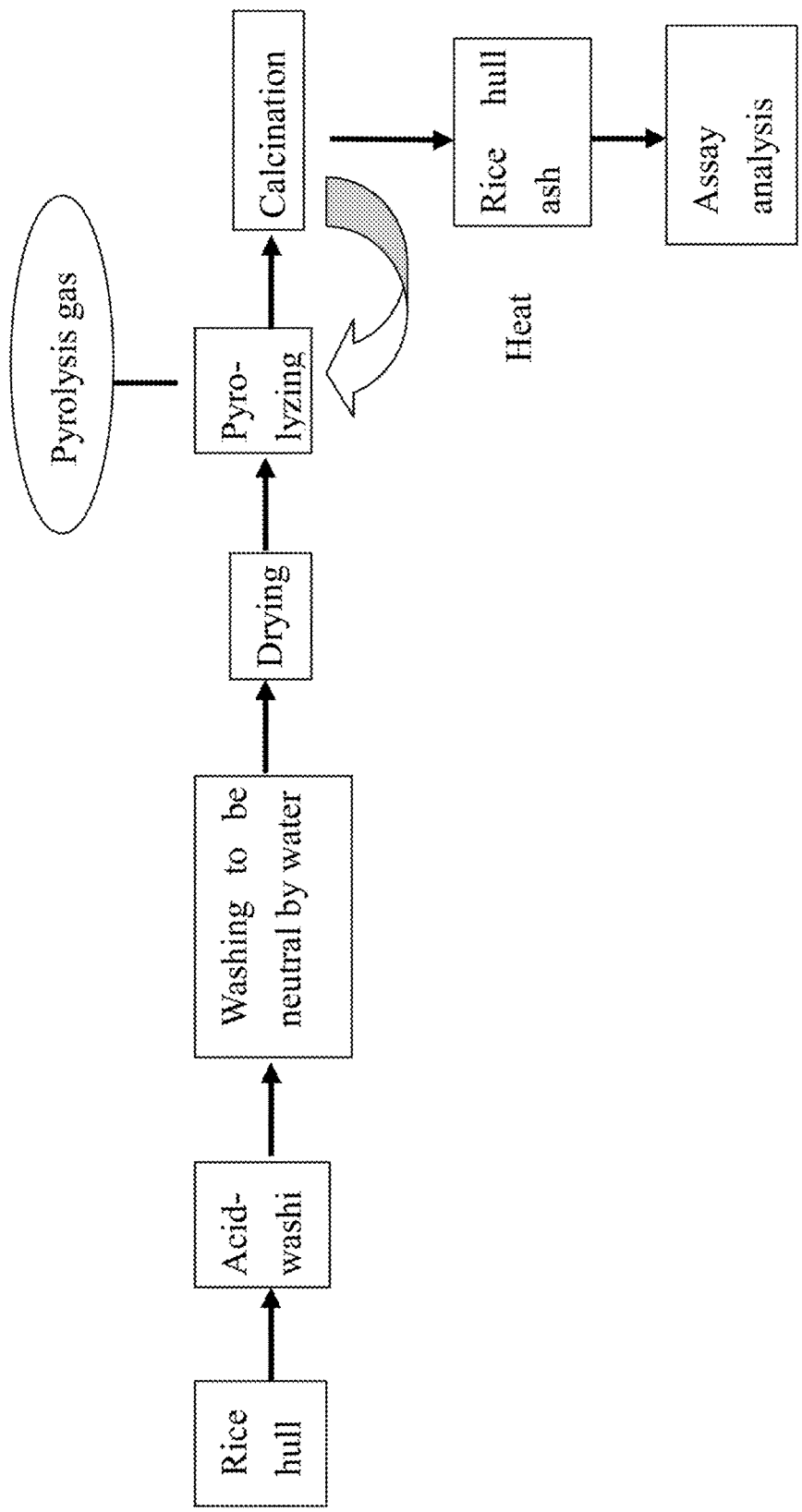
FIG. 1 is a process flow chart of a method for preparation of amorphous silica from biomass containing amorphous silica in accordance with one embodiment of the invention.

As shown in FIG. 1, rice hull was washed with water for removal of impurities such as mud, soaked in 10 wt. % of hydrochloric acid solution for 24 hours, and washed with water repeatedly until the pH value of the washing solution grew neutral. The washed rice hull was dried in a dry oven at 100° C. to achieve constant weight.

The dried rice hull was conveyed to a pyrolysis furnace via a screw conveyer, where the rice hull was pyrolyzed at 600° C. under anaerobic conditions to yield pyrolysis gas and solid residues. The pyrolysis gas was conveyed to a purifying device, purified and stored, or directly conveyed to a gasifier for the production of syngas, or conveyed to a boiler and combusted for power generation.

The solid residues were conveyed to a calcinator and calcined at 650° C. in the presence of air to yield thermal flue gas and calcined product. The thermal flue gas was conveyed back to the pyrolysis furnace for the heat cycle. The calcined product was ground to yield amorphous silica.

Figure 2:
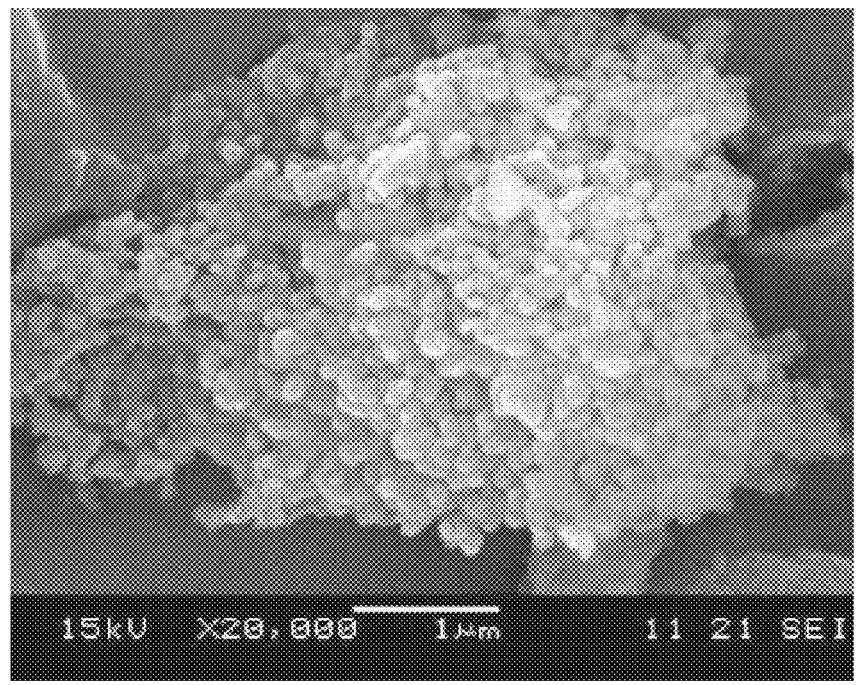
FIG. 2 is a scanning electron microscope (SEM) image of amorphous silica prepared in accordance with Example 1 of the invention.
Figure 3:
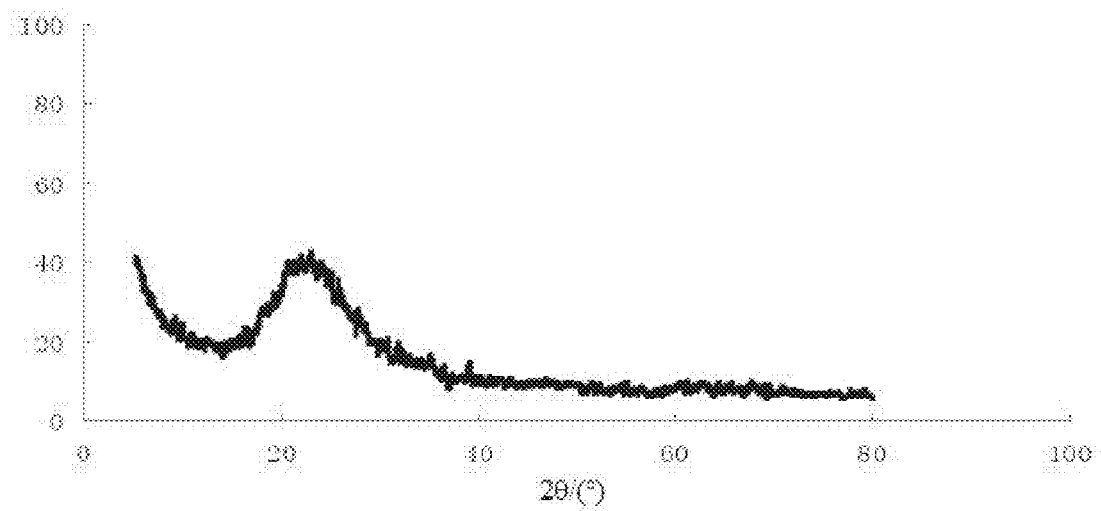
FIG. 3 is an X-Ray Diffraction (XRD) spectrum of amorphous silica prepared in accordance with Example 1 of the invention.

Measurement results from a gas analyzer showed that, the pyrolysis gas comprised CO, $CO_2$, $H_2$, $CH_4$, $C_2H_2$, $C_2H_4$, $C_2H_6$, $C_3H_8$, $C_3H_{10}$, or a mixture thereof. FIG. 2 shows a scanning electron microscope (SEM) image of the amorphous silica prepared in the example, and FIG. 3 shows an X-Ray Diffraction (XRD) spectrum of the amorphous silica. The amorphous silica is unconsolidated spherical particles having a particle size of about 80 nm. XRD spectrum showed that there was no specific crystal diffraction peak, which implied that the silica has an amorphous structure.

Example 2

Rice hull was washed with water for removal of impurities such as mud, soaked in 5 wt. % of nitric acid solution for 24 hours, and washed with water repeatedly until the pH value of the washing solution grew neutral. The washed rice hull was dried at 110° C. to have a moisture content of less than 20%.

The dried rice hull was conveyed to a pyrolysis furnace via a screw conveyer, where the rice hull was pyrolyzed at 800° C. under anaerobic conditions to yield pyrolysis gas and solid residues. The pyrolysis gas was conveyed to a purifying device, purified and stored, or directly conveyed to a gasifier for the production of syngas, or conveyed to a boiler and combusted for power generation.

The solid residues were conveyed to a calcinator and calcined at 800° C. in the presence of air to yield thermal flue gas and calcined product. The thermal flue gas was conveyed back to the pyrolysis furnace for the heat cycle. The calcined product was amorphous silica.

Measurement results from a gas analyzer showed that, the pyrolysis gas comprised CO, $CO_2$, $H_2$, $CH_4$, $C_2H_2$, $C_2H_4$, $C_2H_6$, $C_3H_8$, $C_3H_{10}$, or a mixture thereof. The amorphous silica was analyzed using a scanning electron microscope (SEM) and an X-Ray Diffraction (XRD), which showed the amorphous silica was unconsolidated spherical particles having a particle size of about 80 nm. XRD spectrum showed that there was no specific crystal diffraction peak, which implied that the silica had an amorphous structure.

Example 3

Rice hull was washed with water for removal of impurities such as mud, and dried at 120° C. to have a moisture content of less than 20%. The dried rice hull was conveyed to a pyrolysis furnace via a screw conveyer, where the rice hull was pyrolyzed at 1000° C. under anaerobic conditions to yield pyrolysis gas and solid residues. The pyrolysis gas was conveyed to a purifying device, purified and stored, or directly conveyed to a gasifier for the production of syngas, or conveyed to a boiler and combusted for power generation.

The solid residues were boiled in 5 wt. % of sulfuric acid solution for 4 hours, and washed with water thrice until the pH value of the washing solution grew neutral. The washed rice hull was dried in a dry oven at 102° C. to have a moisture content of less than 30%.

Thereafter, the solid residues were conveyed to a calcinator and calcined at 500° C. in the presence of air to yield thermal flue gas and calcined product. The thermal flue gas was conveyed back to the pyrolysis furnace for the heat cycle. The calcined product was amorphous silica.

Measurement results from a gas analyzer showed that, the pyrolysis gas comprised CO, $CO_2$, $H_2$, $CH_4$, $C_2H_2$, $C_2H_4$, $C_2H_6$, $C_3H_8$, $C_3H_{10}$, or a mixture thereof. The amorphous silica was analyzed using a scanning electron microscope (SEM) and an X-Ray Diffraction (XRD), which showed the amorphous silica was unconsolidated spherical particles having a particle size of about 80 nm. XRD spectrum showed that there was no specific crystal diffraction peak, which implied that the silica had an amorphous structure.

The invention claimed is:

1. A method for preparation of amorphous silica from biomass, the method comprising:
   washing the biomass with 3 to 5 wt. % hydrochloric acid, sulfuric acid, or nitric acid, and drying the biomass;
   after drying, pyrolyzing the biomass under anaerobic conditions to yield a pyrolysis gas and solid residues, collecting the pyrolysis gas; and
   calcining the solid residues in the presence of air to remove carbon residues and to yield amorphous silica.

2. The method of claim 1, wherein the biomass comprises rice hull.

3. The method of claim 1, wherein before washing the biomass with 3 to 5 wt. % hydrochloric acid, sulfuric acid, or nitric acid, and drying of the biomass, the method further comprises washing with water the biomass for removal of impurities.

4. The method of claim 3, wherein washing the biomass with 3 to 5 wt. % hydrochloric acid, sulfuric acid, or nitric acid, and drying of the biomass comprise: soaking the biomass in 3 to 5 wt. % hydrochloric acid, sulfuric acid, or nitric acid at room temperature for between 8 and 24 hours, or at between 80 and 100° C. for between 2 and 6 hours, washing the biomass to be neutral, and drying the biomass.

5. The method of claim 1, wherein the biomass is pyrolyzed at a temperature of between 500 and 1000° C.

6. The method of claim 1, wherein the pyrolysis gas comprises CO, $CO_2$, $H_2$, $CH_4$, $C_2H_2$, $C_2H_4$, $C_2H_6$, $C_3H_8$, $C_3H_{10}$, or a mixture thereof.

7. The method of claim 1, wherein a calcination temperature of the solid residues is between 500 and 800° C.

8. The method of claim 1, wherein a thermal flue gas resulting from the calcination of the solid residues is conveyed back to a pyrolysis furnace for the heat cycle of the pyrolysis.

* * * * *